United States Patent
Wu et al.

(10) Patent No.: US 9,800,143 B2
(45) Date of Patent: Oct. 24, 2017

(54) MOVING-SUM CHARGE PUMP

(71) Applicant: The Regents of the University of Michigan, Ann Arbor, MI (US)

(72) Inventors: Xiao Wu, Ann Arbor, MI (US); David Theodore Blaauw, Ann Arbor, MI (US); Dennis Michael Chen Sylvester, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/261,387

(22) Filed: Sep. 9, 2016

(65) Prior Publication Data

US 2017/0257024 A1      Sep. 7, 2017

Related U.S. Application Data

(63) Continuation-in-part of application No. 15/060,204, filed on Mar. 3, 2016.

(51) Int. Cl.
  *G05F 1/10*    (2006.01)
  *G05F 3/02*    (2006.01)
  *H02M 3/07*    (2006.01)

(52) U.S. Cl.
  CPC .................. *H02M 3/073* (2013.01)

(58) Field of Classification Search
  CPC .. H02M 3/073; H02M 3/07; H02M 2003/077; G11C 5/145; G05F 3/205

(Continued)

(56) References Cited

U.S. PATENT DOCUMENTS 5,940,283 A * 8/1999 Mihara ............... H02M 3/073
                                                            307/110
8,358,520 B2 * 1/2013 Shvartsman ........... H02M 3/07
                                                            327/536

(Continued)

FOREIGN PATENT DOCUMENTS

| EP | 2244365 A1 | 10/2010 |
| JP | 5064584 B1 | 10/2012 |
| JP | 2015089180 A | 5/2015 |

OTHER PUBLICATIONS

Chen, et al.; "A 50nW-to-10mW Output Power Tri-Mode Digital Buck Converter with Self Tracking Zero Current Detection for Photovoltaic Energy Harvesting"; ISSCC 2015; Session 20, pp. 376-377; Feb. 2015 DOI: 10.1109/ISSCC.2015.7063083.

(Continued)

*Primary Examiner* — Quan Tra
(74) *Attorney, Agent, or Firm* — Pramudji Law Group PLLC; Ari Pramudji

(57) ABSTRACT

Various implementations described herein are directed to an integrated circuit. The integrated circuit may include a charge pump stage having multiple charge storage elements arranged to provide multiple sets of voltages in alternating phases. The integrated circuit may include a voltage multiplexing stage having multiple multiplexers arranged to receive the multiple sets of voltages in the alternating phases. Each multiplexer may provide a selected voltage from the multiple sets of voltages based on a conversion ratio. The integrated circuit may include a voltage summing stage having multiple sampling charge storage elements arranged to receive the selected voltages from each multiplexer and provide an output voltage as a sum of the selected voltages received from each multiplexer.

20 Claims, 13 Drawing Sheets

(58) Field of Classification Search
USPC .................................. 327/536; 363/59–60
See application file for complete search history.

(56) References Cited

U.S. PATENT DOCUMENTS

| | | | | |
|---|---|---|---|---|
| 8,817,501 | B1* | 8/2014 | Low | H02M 3/07 363/59 |
| 2001/0033501 | A1 | 10/2001 | Nebrigic | |
| 2005/0007184 | A1* | 1/2005 | Kamijo | H02M 3/07 327/536 |
| 2008/0238536 | A1* | 10/2008 | Hayashi | G11C 5/145 327/537 |
| 2009/0079385 | A1 | 3/2009 | Xiao et al. | |
| 2011/0006194 | A1 | 1/2011 | Pereira et al. | |
| 2011/0006742 | A1 | 1/2011 | Teggatz et al. | |
| 2011/0101938 | A1* | 5/2011 | Ma | H02M 3/07 323/282 |
| 2011/0199057 | A1 | 8/2011 | Ivanov et al. | |
| 2011/0260536 | A1 | 10/2011 | Roy et al. | |
| 2013/0162335 | A1 | 6/2013 | Kim et al. | |
| 2013/0264870 | A1 | 10/2013 | Keysar et al. | |
| 2016/0105098 | A1 | 4/2016 | Savulak et al. | |

OTHER PUBLICATIONS

Liu, et al.; "A 0.45-to-3V Reconfigurable Charge-Pump Energy Harvester with Two-Dimensional MPPT for Internet of Things" ISSCC 2015; Session 20, pp. 371-370; Feb. 2015. DOI: 10.1109/ISSCC.2015.7063080.

Jung, et al.; "A 3nW Fully Integrated Energy Harvester Based on Self-Oscillating Switched-Capacitor DC-DC Converter" ISSCC 2014; Session 23, pp. 398-399; Feb. 2014. DOI: 10.1109/ISSCC.2014.6757486.

Bandyopadhyay, et al.; "A 1.1nW Energy Harvesting System with 544pW Quiescent Power for Next-Generation Implants," ISSCC 2014; Session 23, pp. 396-397; Feb. 2014. DOI: 10.1109/ISSCC.2014.6757485.

PCT International Search Report and Written Opinion; PCT/US2017/020808; May 15, 2017.

* cited by examiner

MOVING-SUM CHARGE PUMP

This non-provisional utility patent application is a continuation-in-part of U.S. patent application Ser. No. 15/060,204, filed Mar. 3, 2016, and titled ENERGY HARVESTER, which is incorporated herein by reference in its entirety.

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Generally, energy harvesting from an ambient environment is an integral factor for self-sustaining sensor nodes, and as such, harvesting minuscule levels of input power sources may enable new application fields. For instance, a miniature 100×100 μm solar cell may generate ~150 pW under low lighting conditions (e.g., 32 lux). In this instance, efficient DC-DC up-conversion from such a low power source voltage to a typical higher power battery voltage may be difficult. In some cases, conventional DC-DC converters may be used in various techniques to reduce input power for harvesting. However, these conventional harvesting techniques are typically bounded by continuous charge pump leakage, which reduces efficiency and overall performance of energy harvesting.

FIG. 1 illustrates a block diagram of a conventional continuous harvester 100 as known in the art. As shown, this harvester 100 may include a continuous charge pump 140 coupled between a solar cell (SOL) and a battery (BAT). In some cases, this charge pump 140 may be implemented as some type of DC-DC converter (e.g., either inductor based or switched-capacitor based DC-DC converters) that may use energy storage elements to generate a continuous power source. Some design techniques have attempted to reduce clock power or quiescent power to extend harvesting power range. However, as with other conventional techniques, these design techniques are typically bounded by continuous charge pump leakage, which may reduce efficiency and overall performance of energy harvesting. Further, in conventional energy harvesting, harvester loss is drawn from maximum power point tracking (MPPT) loss and charge pump efficiency loss. As such, although conventional continuous harvesting may have high solar efficiency, overall efficiency is typically bounded by constantly low efficiency of DC-DC conversion at ultra-low input power levels.

Implementations of various techniques are described herein with reference to the accompanying drawings. It should be understood, however, that the accompanying drawings illustrate only various implementations described herein and are not meant to limit embodiments of various techniques described herein.

Figure 1:
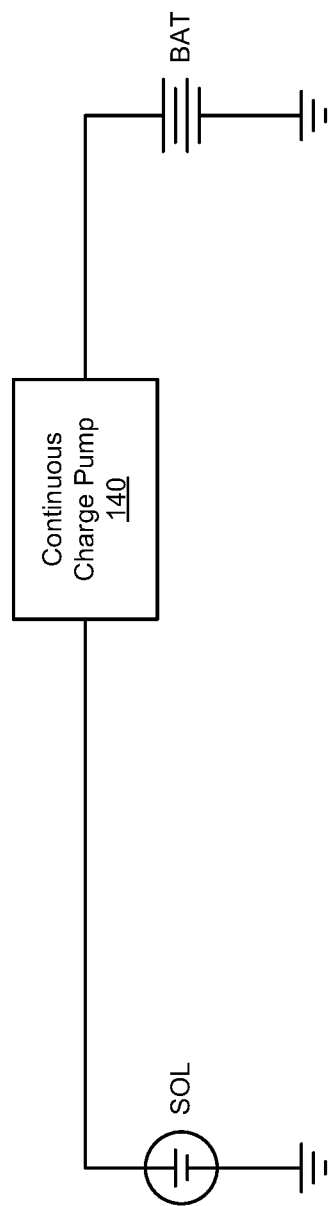
FIG. 1 illustrates a block diagram of a conventional continuous harvester as known in the art.

Various implementations described herein refer to discontinuously harvesting energy from a first power source and transferring the harvested energy to a second power source by switching between energy harvest mode and an energy transfer mode. For instance, by slowly accumulating charge on an input capacitor (during an energy harvest mode) and then transferring accumulated charge to a battery in a burst-mode (during an energy transfer mode), switching and leakage losses in the DC-DC converter may be optimally traded-off with loss due to non-ideal MPPT (maximum power point tracking) operation. In some cases, by using this discontinuous harvesting technique as described herein, harvesting range may be extended to sub-nW levels. Further, energy harvesting from an ambient environment may be extended to miniaturized applications, such as smart sensor nodes or implantable biomedical devices. In these types of applications, various power sources, such as, e.g., solar energy, thermoelectric energy, and/or bio-potential, may be harvested to sustain the sensor nodes. In some cases, due to uncertain environments and miniature size implementations, any energy available for extraction may be minuscule and thus may vary from pW to μW from miniature power sources, such as, e.g., a small solar cell. In these cases, even though harvesting from low input power sources is challenging, various implementations described herein provide for discontinually harvesting power for self-sustaining sensor nodes in substantially low power conditions. In some implementations, a capacitor may be referred to as a charge storage element.

Various implementations described herein may be applied to The Internet of Things (IoT), which refers to a network of physical objects, such as, e.g., devices and various other things embedded with electronics, software, sensors, and network connectivity. IoT enables these physical objects to collect, transmit, and exchange data, and IoT allows objects to be sensed and controlled remotely across network. As such, IoT provides for direct integration of the physical world into computer-based systems, and such application of IoT may result in improved efficiency, accuracy, and cost benefit. Thus, various implementations as described herein may be used in IoT to build next-generation self-sustain sensor nodes or biomedical devices. This technique may enable a life time of sensor nodes that may presently live solely on batteries due to challenging harvesting environments.

Accordingly, various implementations described herein provide a discontinuous energy harvester based on a switch-capacitor (SC) DC-DC converter that is capable of harvesting energy from sub-nW sources, such as, e.g., a harvesting power range from below nW to over ρW. The discontinuous harvester may operate in at least two modes, where energy harvesting and energy transferring are separated. By trading off efficiency at the source for improved efficiency and performance at SC DC-DC conversion, this discontinuous harvesting technique works to transform the challenge of making efficient ultra-low power DC-DC conversion to making a discontinuous energy harvesting system with a simpler and easier to implement SC DC-DC converter.

Further, various implementations described herein provide for moving-sum DC-DC converter circuitry. In some implementations, a structure is provided for implementing a moving-sum DC-DC converter that is designed to improve, reduce, minimize, and/or favorably optimize start-up energy and/or start-up time. In some cases, the structure may use lower start-up energy than common Dickson topology, while maintaining comparable efficiency as a Dickson charge pump. Generally, start-up energy may refer to an amount of energy for charging fly capacitors to a steady state value, and the energy consumed by clock/switch drivers during a start-up phase. For instance, the energy utilized to charge fly capacitors is proportional to $CV^2$. The conventional Dickson charge pump may have high efficiency in steady state, but it typically uses a large amount of energy stored in the fly capacitors initially. This is because the conventional Dickson charge pump may use a large number of discrete fly capacitors, and each fly capacitor may be initialized to its intended or expected charge voltage. In contrast, as described and provided herein, the structure for the moving-sum DC-DC converter (i.e., moving-sum charge pump) is an improved design that implements a 3-phase moving-sum technique. These and various other features related thereto are provided in greater detail herein.

Various implementations of providing discontinuous energy harvesting will now be described in greater detail herein with reference to FIGS. 2A-7.

Figure 2A:
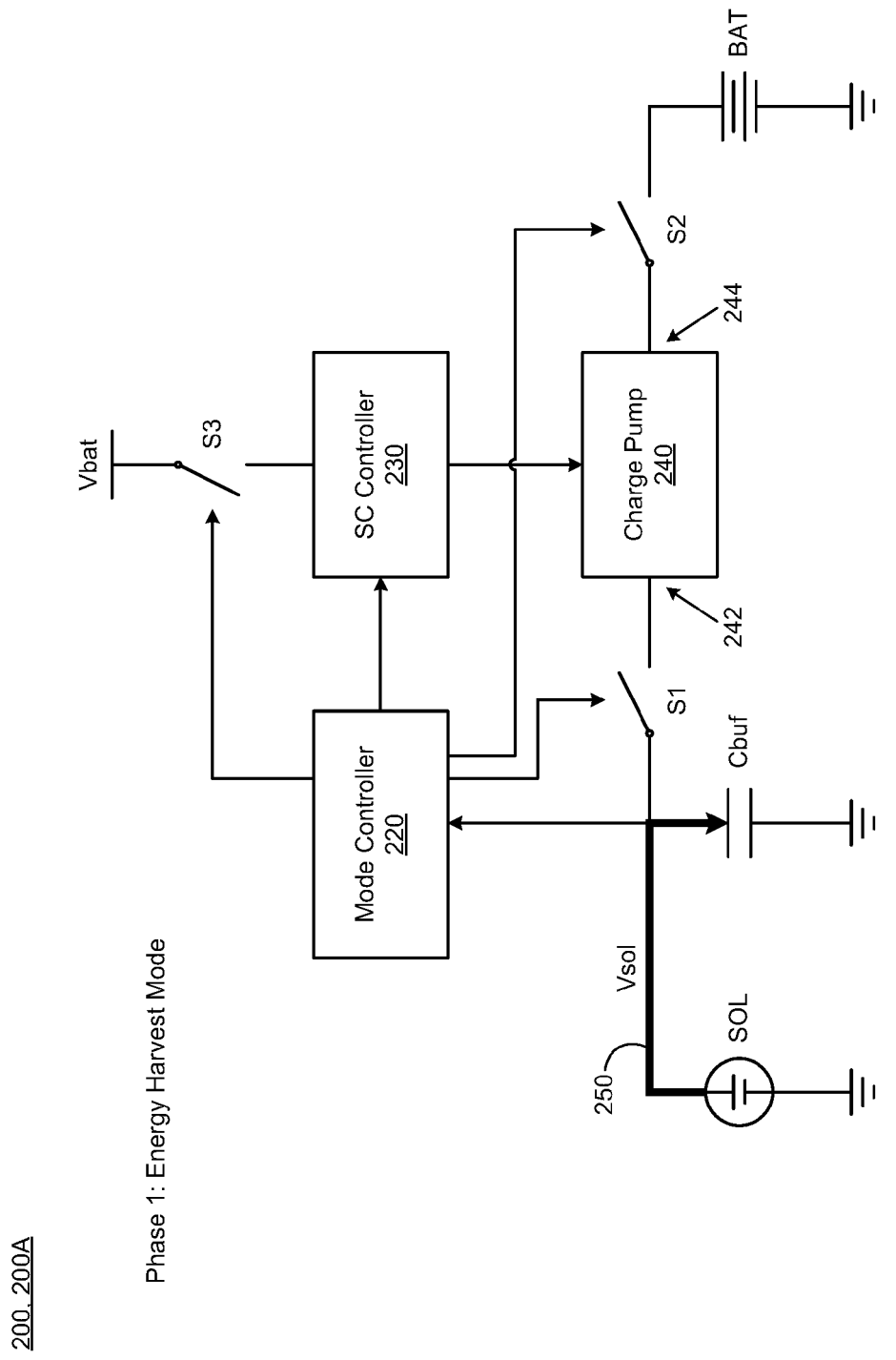
FIGS. 2A-2B illustrate a block diagram of a discontinuous energy harvester, in accordance with various implementations described herein.
Figure 2B:
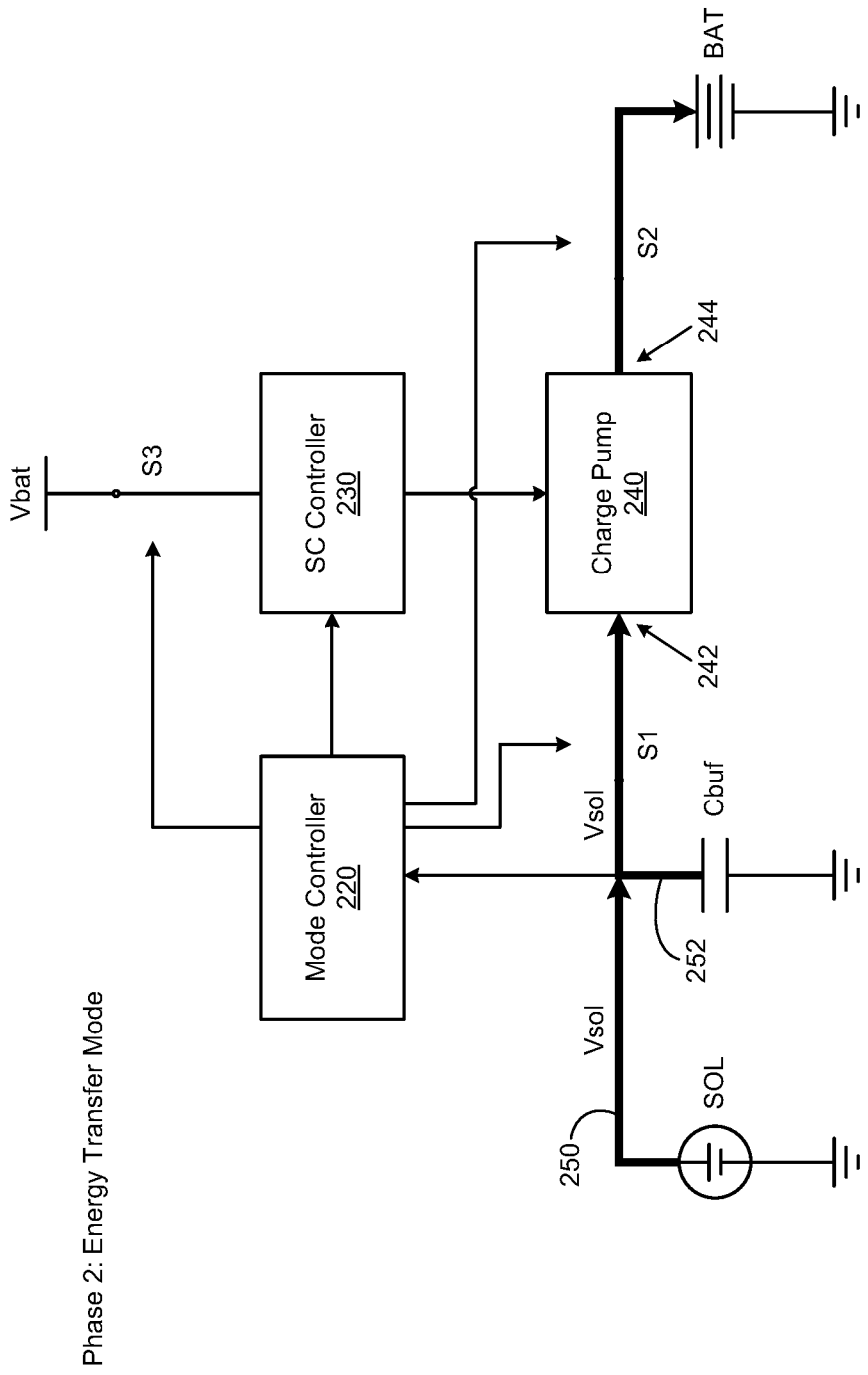
Figure 2C:
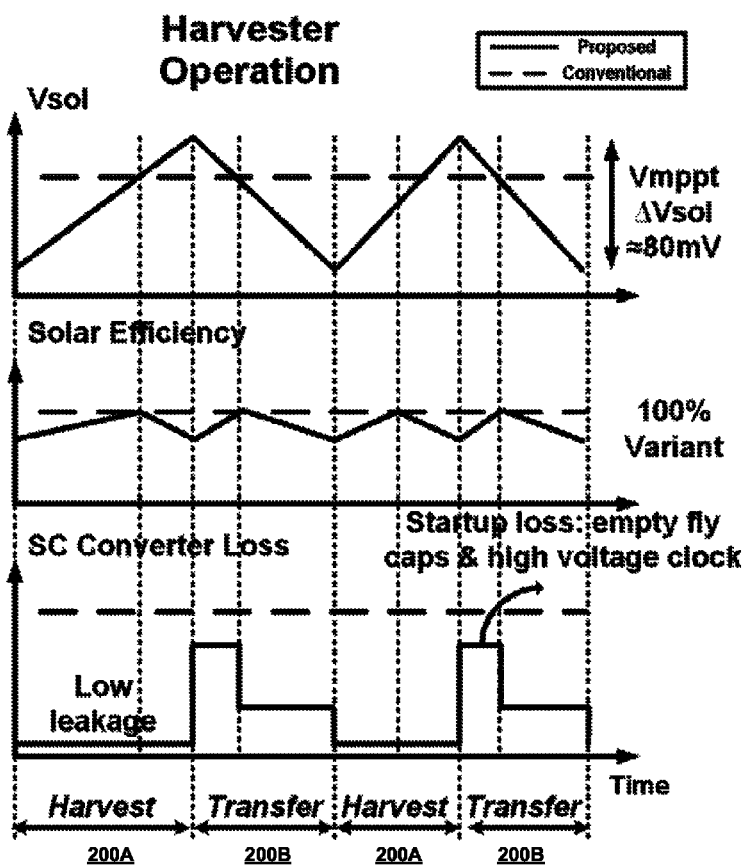
FIG. 2C illustrates a harvester operation diagram of the discontinuous energy harvester, in accordance with various implementations described herein.

FIGS. 2A-2B illustrate a block diagram of a discontinuous energy harvester 200, in accordance with various implementations described herein. In particular, FIG. 2A illustrates a diagram of the discontinuous energy harvester 200 in an energy harvest mode 200A of operation, and FIG. 2B illustrates a diagram of the discontinuous energy harvester 200 in an energy transfer mode 200B of operation. The energy harvest mode 200A may refer to a first phase (Phase 1) of operation, and the energy transfer mode 200B may refer to a second phase (Phase 2) of operation. Further, FIG. 2C illustrates a harvester operation diagram of the discontinuous energy harvester 200, in accordance with various implementations described herein.

The discontinuous energy harvester 200 of FIGS. 2A-2B may be implemented as an integrated circuit, a discrete circuit, as components on a printed circuit board (PCB), and/or any other similar type of circuitry. In some cases, the harvester 200 may be implemented as a device, apparatus, etc. having an integrated circuit, components on a printed circuit board (PCB), and/or any other type of similar circuitry. Generally, in reference to manufacturing and fabrication processes, electronic designers may employ various techniques to design integrated circuits, PCBs, and any other similar circuitry, such as physical chips and/or physical layers, to implement the harvester 200 and/or techniques thereof.

As shown in reference to FIGS. 2A-2B, the harvester 200 may include a charge pump 240 coupled between multiple power sources, i.e., a first power source SOL and a second power source BAT. In some cases, the first power source SOL may include a solar power source, such as e.g., a solar cell, and the second power source BAT may include a battery cell, such as re-chargeable battery. Further, as shown, the harvester 200 may include a buffering capacitor Cbuf coupled between the first power source SOL and an input 242 of the charge pump 240. In some cases, the power sources SOL, BAT and the capacitor Cbuf may be coupled to some type of ground GND, such as a common analog ground or bus in an integrated circuit (IC) implementation.

FIGS. 2A-2B refer to an energy transfer order. For instance, in the energy harvest mode 200A of FIG. 2A, energy is harvested from the first power source SOL (e.g., a solar cell) and stored in the buffering capacitor Cbuf. Further, in energy transfer mode 200B of FIG. 2B, energy is transferred from the buffering capacitor Cbuf to the second power source BAT (e.g., a battery). In some cases, as further described herein, operation of the switches S1-S3 may be used to reduce leakage.

In the energy harvest mode 200A as shown in FIG. 2A, the charge pump 240 may be decoupled from the first and second power sources SOL, BAT. Further, while the charge pump 240 is decoupled from the first and second power sources SOL, BAT, the first power source SOL may charge the buffering capacitor Cbuf with a first voltage Vsol. As shown in FIG. 2A, the harvesting of the first voltage Vsol from the first voltage source SOL is indicated with a first bold arrow 250. In some cases, the first power source SOL is configured to charge the buffering capacitor Cbuf from a first voltage state (e.g., low voltage state VL) to a second voltage state (e.g., high voltage state VH) with the first voltage Vsol, and the second voltage state is at least greater than the first voltage state. Further, in some cases, during discharge of the buffering capacitor Cbuf, the first voltage Vsol (stored in the buffering capacitor Cbuf) discharges from the second voltage state (e.g., high voltage state VH) to the first voltage state (e.g., low voltage state VL). In some cases, discharge occurs in the energy transfer mode. For instance, in the energy transfer mode 200B of FIG. 2B, the charge pump 240 is coupled to the buffering capacitor Cbuf and the second power source BAT, and charge (or voltage) stored by the buffering capacitor Cbuf is transferred from the buffering capacitor Cbuf to the second power source BAT. As such, charge (or voltage) stored by the buffering capacitor Cbuf (Vsol) discharges from the second voltage state (e.g., high voltage state VH) to the first voltage state (e.g., low voltage state VL). These and other aspects are disclosed further herein.

As shown in FIGS. 2A-2B, the harvester 200 may include a first switch S1 coupled between the buffering capacitor Cbuf and the input 242 of the charge pump 240. Further, as shown, the first switch S1 may also be coupled between the first power source SOL and the input 242 of the charge pump 240. This arrangement may provide for selectively decoupling the charge pump 240 from the first power source SOL and the buffering capacitor Cbuf during the energy harvest mode 200A to reduce leakage. In addition, as shown in FIGS. 2A-2B, the harvester 200 may include a second switch S2 coupled between an output 244 of the charge pump 240 and the second power source BAT for selectively decoupling the second power source BAT from the charge pump 240 during the energy harvest mode 200A to further reduce leakage. Further, as described below, a third switch S3 may be implemented so that a switched-capacitor controller (SC) controller 230 and charge pump switch drivers in the charge pump 240 may be power gated during the energy harvest mode 200A to reduce leakage power.

In the energy transfer mode 200B as shown in FIG. 2B, the charge pump 240 is coupled to the buffering capacitor Cbuf and the second power source BAT to transfer the first voltage Vsol from the buffering capacitor Cbuf (as stored energy) to the second power source BAT during discharge of the first voltage Vsol from the buffering capacitor Cbuf. Generally, as known in the art, transfer of voltage may refer to transfer of charge, and similarly, transfer of energy (or power) may refer to transfer of charge.

As shown in FIG. 2B, the transferring of the first voltage Vsol from the buffering capacitor Cbuf is indicated with a second bold arrow 252. Further, in the energy transfer mode 200B, the charge pump 240 may receive the first voltage Vsol from the first power source SOL and transfer the first voltage Vsol (along with the voltage stored in the buffering capacitor Cbuf) to the second power source BAT. As such, the first voltage Vsol and the stored voltage from the buffering capacitor Cbuf may be used to charge the second power source BAT. As further shown in FIG. 2B, the harvesting and/or transferring of the first voltage Vsol from the first voltage source SOL is indicated with the first bold arrow 250. In one implementation, only the voltage stored in the buffering capacitor Cbuf (without the first voltage Vsol) is transferred to the second power source BAT.

Accordingly, in the energy transfer mode 200B as shown in FIG. 2B, the charge pump 240 is coupled to the first power source SOL by closing the first switch S1, and the charge pump 240 is further coupled to the second power source BAT by closing the second switch S2. Closing the first and second switches S1, S2 allows transfer of the first voltage Vsol from the first power source SOL and the first voltage Vsol from the buffering capacitor Cbuf (as stored voltage) to the second power source BAT. As such, when the first and second switches S1, S2 are closed, the buffering capacitor Cbuf transfers the first voltage Vsol (as stored voltage) to the second power source BAT during discharge of the buffering capacitor Cbuf.

In some cases, the first voltage Vsol is discontinually transferred from the first power source SOL to the second power source BAT via the buffering capacitor Cbuf and the charge pump 240. Further, in some cases, by switching between the energy harvest mode and the energy transfer mode, the first voltage Vsol is discontinually harvested and/or transferred from the first power source SOL to the second power source BAT via the buffering capacitor Cbuf and the charge pump 240. Further, in some cases, for voltage Vsol, the term "up-convert" may be used instead of the term "transfer". For energy and/or power, the term "transfer" may be used. For instance, the input voltage Vsol may be up-converted to battery voltage BAT, and the energy stored in the capacitor Cbuf may be transferred to the battery BAT.

As shown in FIGS. 2A-2B, the harvester 200 may include a mode controller 220 configured for sensing the first voltage Vsol at the first power source SOL and the buffering capacitor Cbuf. In some implementations, the mode controller 220 may be configured to control the switching between the energy harvest mode 200A of FIG. 2A and the energy transfer mode 200B of FIG. 2B, thereby discontinuously transferring the first voltage Vsol from the first power source SOL to the second power source BAT via the buffering capacitor Cbuf and the charge pump 240.

In some instances, when the charge pump 240 is not operating in the energy harvest mode 200A, the efficiency loss may be caused by a small deviation of source bias voltage from its upper-boundary power point. When in the energy transfer mode 200B, the charge pump 240 is coupled to the buffering capacitor Cbuf and the second power source BAT so as to transfer energy from the buffering capacitor Cbuf to the second power source BAT. Further, in the energy transfer mode 200B, the charge pump 240 is coupled to the first power source SOL and the second power source BAT to transfer energy from the first power source SOL to the second power source BAT.

In some cases, the charge pump 240 may include a switched capacitor (SC) network adapted for transferring the first voltage Vsol from the buffering capacitor Cbuf to the second power source BAT during discharge of the buffering capacitor Cbuf. Thus, in some cases, the harvester 200 may further include the switched capacitor (SC) controller 230 configured for receiving control signals from the mode controller 220 to control the SC network of the charge pump 240 based on the received control signals. Further, in some cases, the harvester 200 may further include a third switch S3 coupled between the second power source BAT and the SC controller 230 for decoupling the SC controller 230 from the second power source BAT during the energy harvest mode 200A to further reduce leakage. In some cases, the SC controller 230 may receive a battery voltage Vbat supplied from the second power source BAT, when the third switch S3 is closed, during the energy transfer mode 200B of FIG. 2B.

Accordingly, the harvester 200 of FIGS. 2A-2B may use the buffering capacitor Cbuf between the first power source SOL and the input 242 of the charge pump 240 to discontinuously transfer power to the second power source BAT. As shown in FIGS. 2A-2B, the harvester 200 operates in two modes: the energy harvest mode 200A and the energy transfer mode 200B. In the energy harvest mode 200A, the first power source SOL charges the buffering capacitor Cbuf from a low voltage state VL to a high voltage state VH, while the charge pump 240 is decoupled from the first power source SOL and the second power source BAT. Further, as described herein, components of the harvester 200 are power-gated with the switches S1, S2, S3 to reduce leakage during the energy harvest mode 200A.

Various implementations of the present disclosure provide for an improved energy trade-off. For instance, efficiency loss caused by deviation of source maximum power point may occur during the entire harvest/transfer operation and not just in transfer mode. This may be due to Vsol constantly changing in this discontinuous harvesting technique, while in conventional harvesting, Vsol is fixed at Vmppt, as shown in FIG. 2C. Further, the power transferred may be an optimal power point of the charge pump 240, and thus, the transfer of power may avoid charge pump loss due to charge leakage. In the conventional harvester 100 of FIG. 1, harvester loss may come from a maximum power point tracking (MPPT) loss and charge pump efficiency loss. Therefore, system efficiency may be bounded by the constantly low efficiency of the conventional DC-DC converter at ultra-low input power level. In contrast, the discontinuous harvester 200 of FIGS. 2A-2B decouples the two main losses in two modes of operation to achieve an improved trade-off. Thus, the MPPT efficiency may be slightly lower in the energy harvest mode 200A, but the charge pump 240 efficiency may be higher in energy transfer mode 200B.

FIG. 2C illustrates a harvester operation diagram 200C of the discontinuous energy harvester 200 of FIGS. 2A-2B. In particular, FIG. 2C visually illustrates the discontinuous harvesting technique of FIGS. 2A-2B based on an observation that at low power levels, charge pump efficiency may plummet, while efficiency of the energy source remains high due to continuing operation at its maximum power point. The discontinuous harvesting technique may operate in at least two modes, which strives to achieve balance between these two efficiencies and obtain higher overall end-to-end efficiency. For instance, in the energy harvest mode 200A, the charge pump 240 is power gated with the switches S1, S2 to reduce its leakage, e.g., to just a few pW, while the first power source SOL charges the buffering capacitor Cbuf. In the energy transfer mode 200B, the charge pump 240 is enabled via the switches S1, S2, and energy accumulated at the buffering capacitor Cbuf is transferred to the second power source BAT. In some cases, the voltage from the buffering capacitor Cbuf may deviate from the MPPT point of the first power source SOL, and thus, the transfer efficiency to the buffering capacitor Cbuf may be reduced. However, since the charge pump 240 operates at a higher power level (µW) during the energy transfer mode 200B, its efficiency may significantly improve.

Using these two modes 200A, 200B, the discontinuous energy harvester 200 may decouple the two main losses and thus allow optimal trade off that enables efficient operation across a wide range of input power (e.g., 23,000× in some cases). Further, the mode controller 220 may be configured as an asynchronous mode controller with <15 pW power consumption to control mode switching. In some cases, the asynchronous mode controller may maintain a constant power source voltage fluctuation (ΔVsol of FIG. 2C), thereby automatically increasing the duty cycle at low input power levels and maintaining optimal end-to-end efficiency. Further, as described herein below in FIG. 6, a moving-sum charge pump may be used for low start-up energy, so as to reduce overhead during transition between the harvest and transfer modes. For instance, in measurement, the harvester 200 may achieve 37% end-to-end efficiency at 66 pW input power drawn from a 0.01 mm$^2$ solar cell at 6 lux and have a maximum input power of 1.5 µW.

Figure 3A:
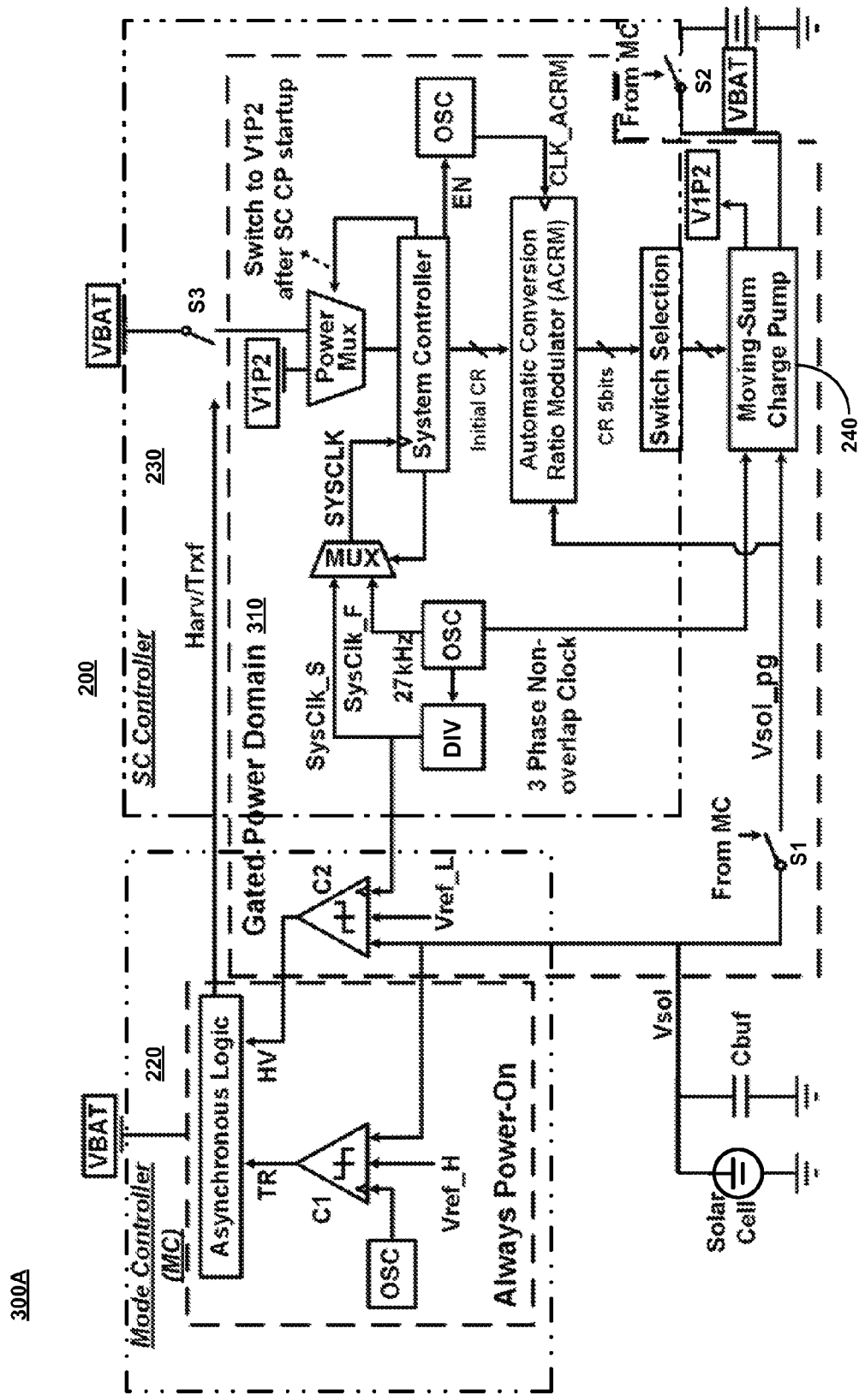
FIG. 3A illustrates an architectural component diagram of a discontinuous energy harvester, in accordance with various implementations described herein.
Figure 3B:
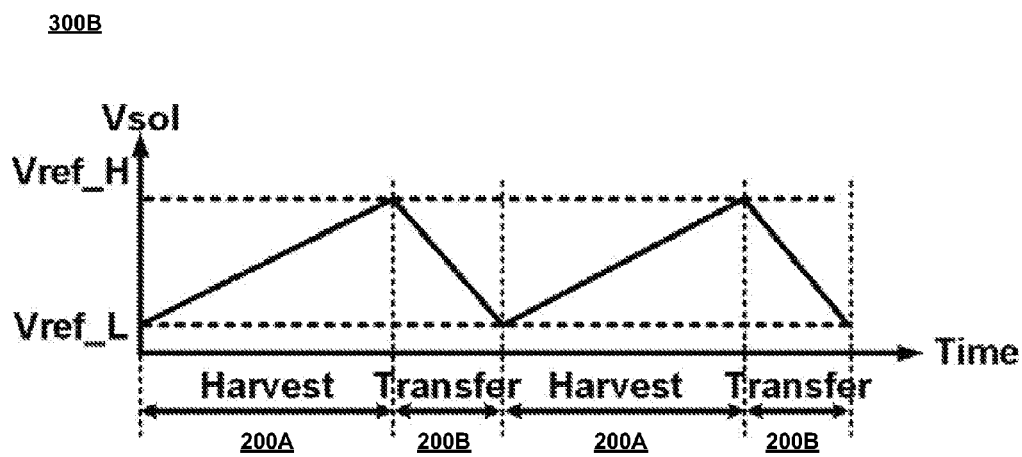
FIGS. 3B-3C illustrate phase transition diagrams of the discontinuous energy harvester of FIG. 3A, in accordance with various implementations described herein.
Figure 3C:
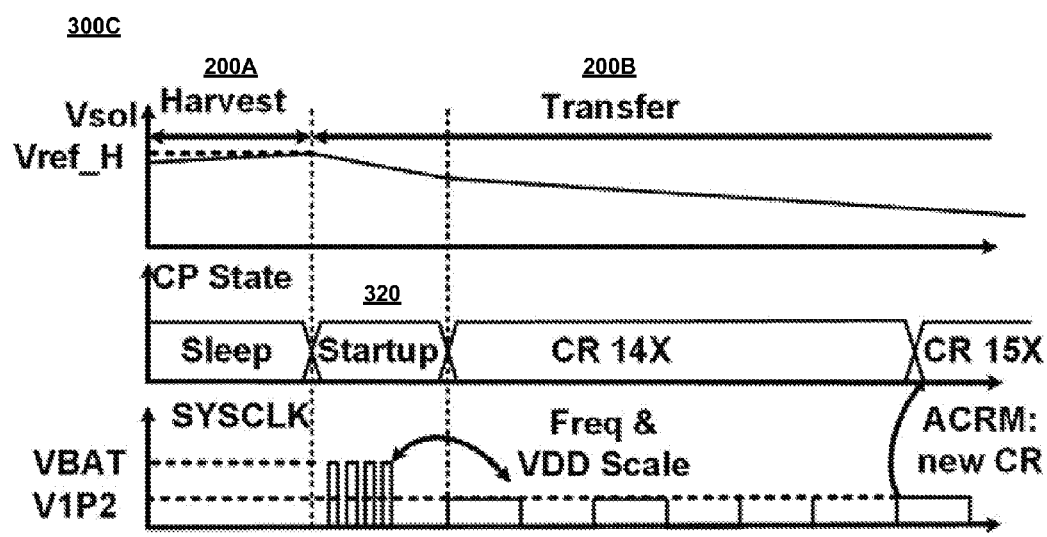
Figure 4:
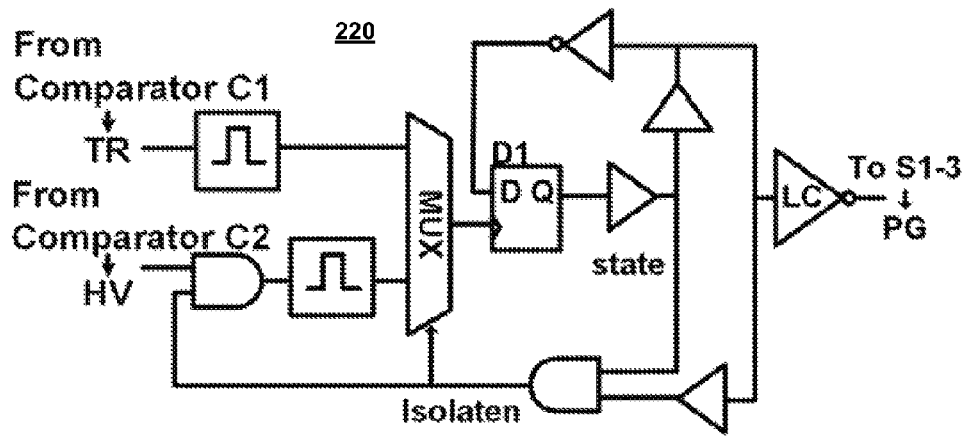
FIG. 4 illustrates a diagram of a mode controller for a discontinuous energy harvester, in accordance with various implementations described herein.
Figure 5:
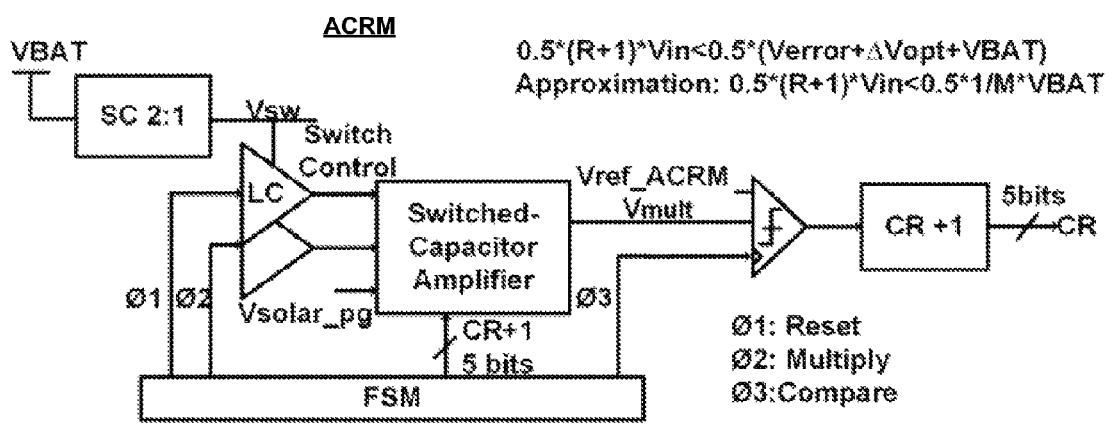
FIG. 5 illustrates a diagram of an automatic conversion ratio modulator for a discontinuous energy harvester, in accordance with various implementations described herein.
Figure 6:
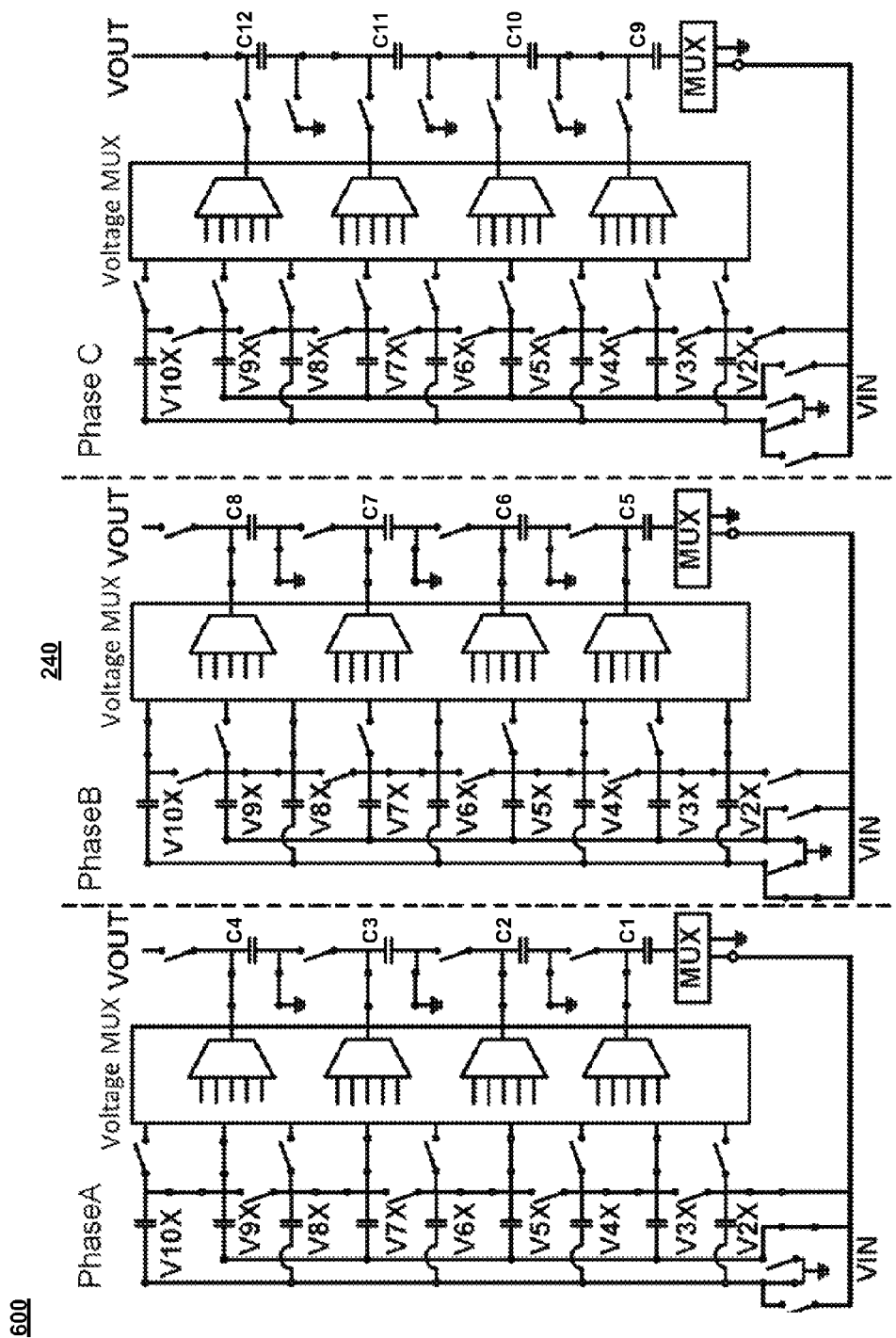
FIG. 6 illustrates a diagram of a charge pump for use with a discontinuous energy harvester, in accordance with various implementations described herein.

FIGS. 3A-6 illustrate an implementation of the discontinuous energy harvester 200 of FIGS. 2A-2C. In particular, FIG. 3A illustrates an architectural component diagram 300A of the discontinuous energy harvester 200, and FIGS. 3B-3C illustrate phase transition diagrams 300B, 300C of the discontinuous energy harvester 200 of FIG. 3A. FIG. 4 illustrates a diagram 400 of the mode controller 220 for the discontinuous energy harvester 200, FIG. 5 illustrates a diagram 500 of an automatic conversion ratio modulator (ACRM) for the discontinuous energy harvester 200, and FIG. 6 illustrates a diagram 600 of the charge pump 240 (e.g., a moving-sum charge pump) for use with the discontinuous energy harvester 200.

In reference to FIG. 3A, the harvester 200 may include the buffering capacitor Cbuf, the (always-on) mode controller 220, the SC controller 230, the charge pump 240, the switches S1, S2, S3, and various comparator inputs Vref_L, Vref_H. In some cases, the harvester 200 may operate in a gated power domain 310. Further, the mode controller 220 may include asynchronous logic, a first comparator C1, a second comparator C2, and an oscillator OSC. In some cases, the mode controller 320 may operate in an always-on mode of operation. Still further, the SC controller 230 may include a power MUX, a system controller, the ACRM, a switch selection module, oscillators OSC, a MUX, a Frequency Divider DIV, and voltage input V1P2. These components of FIG. 3A are arranged to implement the discontinuous energy harvester 200 as described herein.

During the energy harvest mode 200A, switches S1, S2, S3 are open to reduce leakage from the second power source BAT and the buffering capacitor Cbuf to near pW range. The first voltage Vsol may be monitored by the mode controller 220, which may be implemented as an asynchronous mode controller. As shown in FIG. 3B, when the first voltage Vsol crosses Vref_H, the mode controller 220 switches to the energy transfer mode 200B. This switching closes the switches S1, S2, S3 to enable power transfer from the buffering capacitor Cbuf to the second power source BAT. As shown in FIG. 3C, this switching also provides for the charge pump 240 to enter a startup phase 320 where the charge pump conversion ratio is initialized while the clock and logic operate from the second power source BAT. In some cases, the second power source BAT may operate at approximately 4V. After the charge pump voltages stabilize, the harvester 200 switches to an internally generated voltage supply (e.g., 1.2V supply) to reduce switching power loss. In some cases, since the charge pump 240 transfers charge from the buffering capacitor Cbuf, and not a variable current source, the optimal pump frequency may be predetermined for both startup and operation modes, which may significantly simplify the charge pump design. As further shown in FIG. 3C, clock frequency change from startup to operation mode may be performed by a glitch-free clock mux. As the charge pump 240 drains the buffering capacitor Cbuf, the first voltage Vsol drops, and the ACRM adjusts the charge pump conversion ratio to maintain optimum efficiency. As shown in FIG. 3B, when the first voltage Vsol<Vref_L, the mode controller 220 is configured to power gate the charge pump 240 and change to the energy harvest mode 200A.

In some implementations, in reference to FIG. 4, the mode controller 220 may be implemented as a low-power mode controller, which may be used to determine a lower bound of harvestable input power. In reference to the diagram 400 of FIG. 4, an asynchronous design for an implementation of the mode controller 220 may be used to save clock and logic power. In this instance, the mode may be stored in a flip-flop D1, which toggles based on multiple comparators C1 and C2. In some implementations, the low power mode controller may have <100 gates, may be implemented in thick-oxide I/O devices, and may consume <15 pW (when measured). Further, a diode stack may be used to lower supply voltage from 4V to 1.6V, reducing the impact of gate-induced drain leakage (GIDL).

In transfer mode, the charge pump conversion ratio may be modulated based on ΔV=Vin*R−Vout, where R is the conversion ratio and ΔV is an indicator of conduction loss. In reference to the diagram 500 of FIG. 5, the ACRM may approximate ΔV by multiplying an input voltage Vsolar_pg by M*(R+1)=Vmult, where M is a fixed weight and R is the current conversion ratio. Vmult is then compared to a fixed threshold Vref_ACRM. If Vmult<Vref_ACRM, a ratio counter increments, changing the conversion ratio to R+1, and multiplication may be done by a switched-capacitor amplifier. In some cases, switch drivers for this amplifier may be supplied by an auxiliary 2:1 DC-DC converter to reduce power consumption. Further, the ACRM may be duty cycled and only enabled every three SYSCLK cycles. After each modulation, ACRM may shut down its clock by itself.

In some implementations, as shown in the diagram 600 of FIG. 6, the charge pump 240 may be implemented as a 3-phase moving-sum charge pump to reduce startup energy. In FIG. 6, the 3-phases are shown as Phase A, Phase B, & Phase C. In some cases, charge in flying capacitors may leak away during the harvest mode, and the charge may be restored during the startup phase, thus presenting a power overhead. Sometimes, a conventional Dickson charge pump maintains high efficiency in operation mode, but the startup energy is high due to the large number of flying capacitors and their high voltage potential. Therefore, the moving-sum charge pump 240 as shown in FIG. 6 is provided and includes a charge pump with multiple stages (e.g., 10 stages: V2X, V3X, . . . , V10X), followed by a modified series-parallel (S-P) charge pump with multiple flying capacitors (e.g., 4: C1, C2, . . . , C12) to boost the charge pump conversion ratio. In phases A and B, the charge pump operates with four selected voltages connected to four flying capacitors (C1-C4 and C4-C8) in each S-P stage. Further, in phase C, the four S-P flying capacitors (C9-C12) are connected in series to achieve 10-20× conversion ratios.

Accordingly, in reference to FIGS. 3A-6, a discontinuous harvesting technique is presented with switched-capacitor (SC) DC-DC converters that enable ultra-low power energy harvesting. By slowly accumulating charge on the buffering capacitor Cbuf, and then transferring it to the second power source BAT in burst-mode, switching and leakage losses in the DC-DC converter may be optimally traded-off with the loss due to non-ideal MPPT operation. The harvester 200 may use a low power (e.g., 15 pW) mode controller 220, an automatic conversion ratio modulator (ACRM), and a moving-sum charge pump 240 for low startup energy upon mode switch. In some implementations, e.g., in reference to 180 nm CMOS, the discontinuous energy harvester 200 may achieve >40% end-to-end efficiency from 113 pW to 1.5 µW with 66 pW minimum input power, thus marking a >10× improvement over conventional ultra-low power harvesters.

Figure 7:
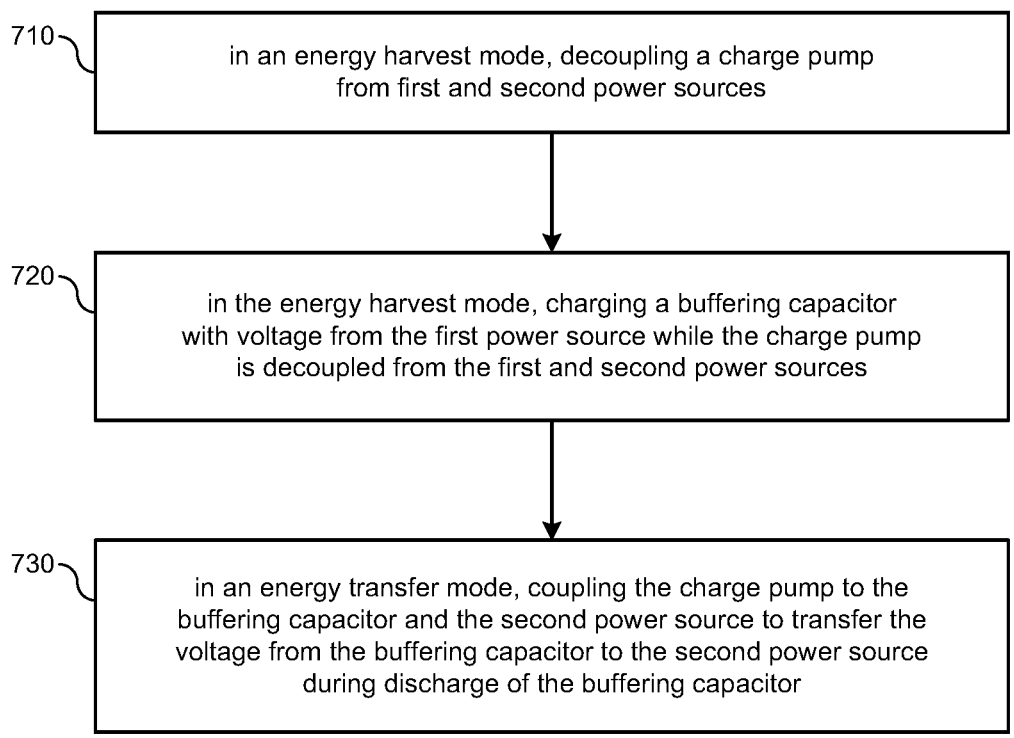
FIG. 7 illustrates a method for discontinuous energy harvesting from a power source, in accordance with various implementations described herein.

FIG. 7 illustrates a method 700 for discontinuous energy harvesting from a power source, in accordance with various implementations described herein.

It should be understood that even though method 700 may indicate a particular order of execution of operations, in some instances, various certain portions of the operations may be executed in a different order, and on different systems. In some other instances, additional operations or steps may be added to and/or omitted from method 700. The method 700 may be implemented in hardware and/or software. If implemented in hardware, the method 700 may be implemented with various circuit components, such as described herein above in reference to FIGS. 2A-6. If implemented in software, the method 700 may be implemented as a program or software instruction process that may be configured for providing discontinuous energy harvesting. Further, if implemented in software, instructions related to implementing the method 700 may be stored in memory and/or a database. For instance, a computer or various other computing devices having a processor and memory may be configured to perform method 700.

In some implementations, method 700 is directed to harvesting energy from a first power source and transferring the harvested energy to a second power source by switching between an energy harvest mode and an energy transfer mode. For instance, at block 710, in the energy harvest mode, method 700 may decouple a charge pump from first and second power sources. At block 720, in the energy harvest mode, method 700 may charge a buffering capacitor with voltage from the first power source while the charge pump is decoupled from the first and second power sources. At block 730, in the energy transfer mode, method 700 may couple the charge pump to the buffering capacitor and the second power source to transfer the voltage from the buffering capacitor to the second power source during discharge of the buffering capacitor.

In some implementations, in the energy transfer mode, method 700 may couple the charge pump to the first power source to transfer the voltage from the first power source along with the stored first voltage from the buffering capacitor to the second power source. The voltage transfer to the second power source may occur during discharge of the buffering capacitor. In one implementation, only the first voltage stored in the buffering capacitor (without the voltage from the first power source) is transferred to the second power source. Further, method 700 may couple the charge pump between the first and second power sources and couple the buffering capacitor between the first power source and an input of the charge pump. The charge pump may be configured to receive the voltage from the first power source and the capacitor and transfer at least a portion of the voltage to the second power source during discharge of the buffering capacitor.

Further, various implementations described herein provide for moving-sum DC-DC converter circuitry, which may be referred to as a moving-sum charge pump. In some implementations, the structure for moving-sum charge pump provides for an improved design that implements a 3-phase moving-sum technique.

Figure 8A:
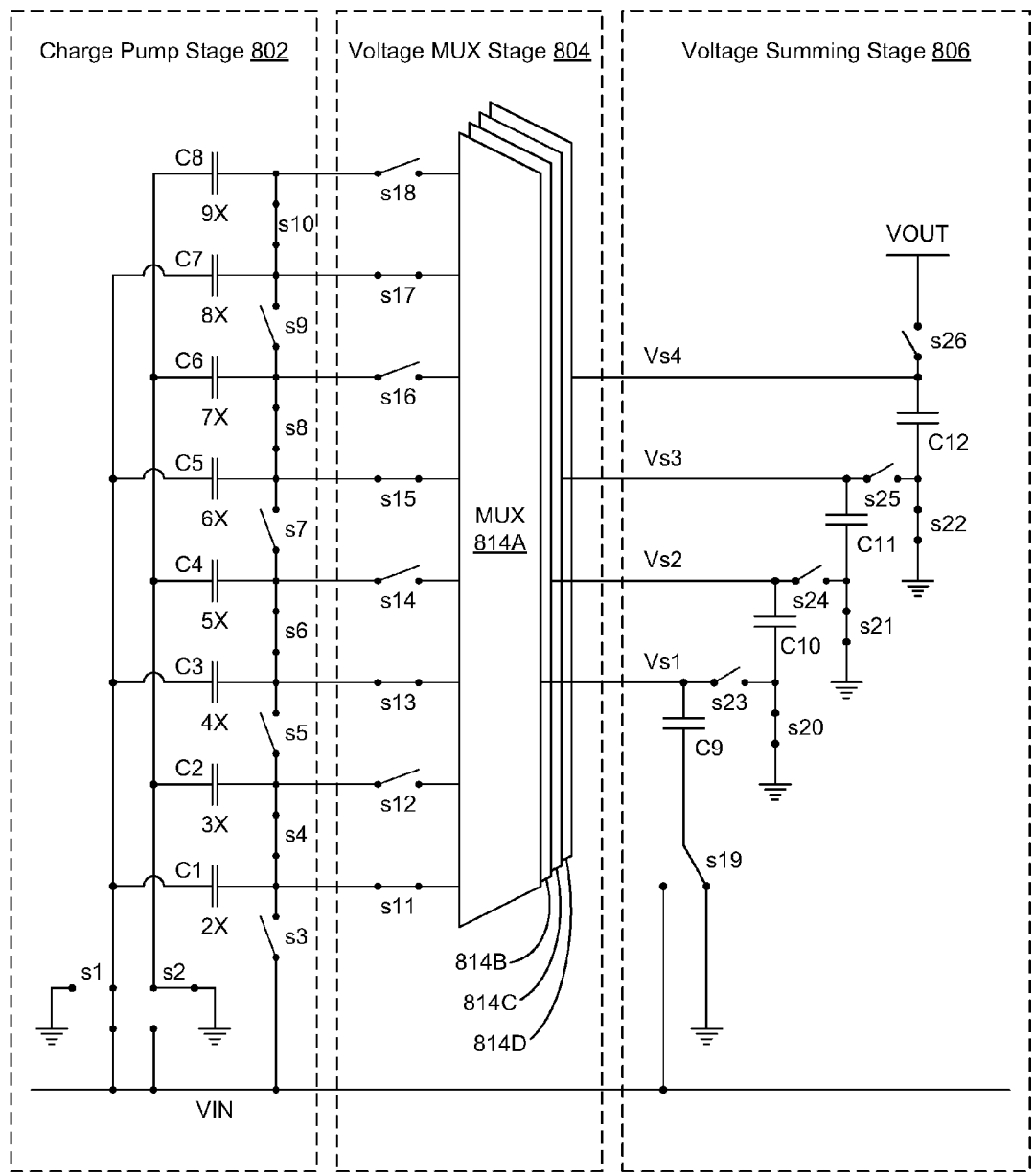
FIGS. 8A-8C illustrate various schematic diagrams of moving-sum charge pump circuitry, in accordance with various implementations described herein.
Figure 8B:
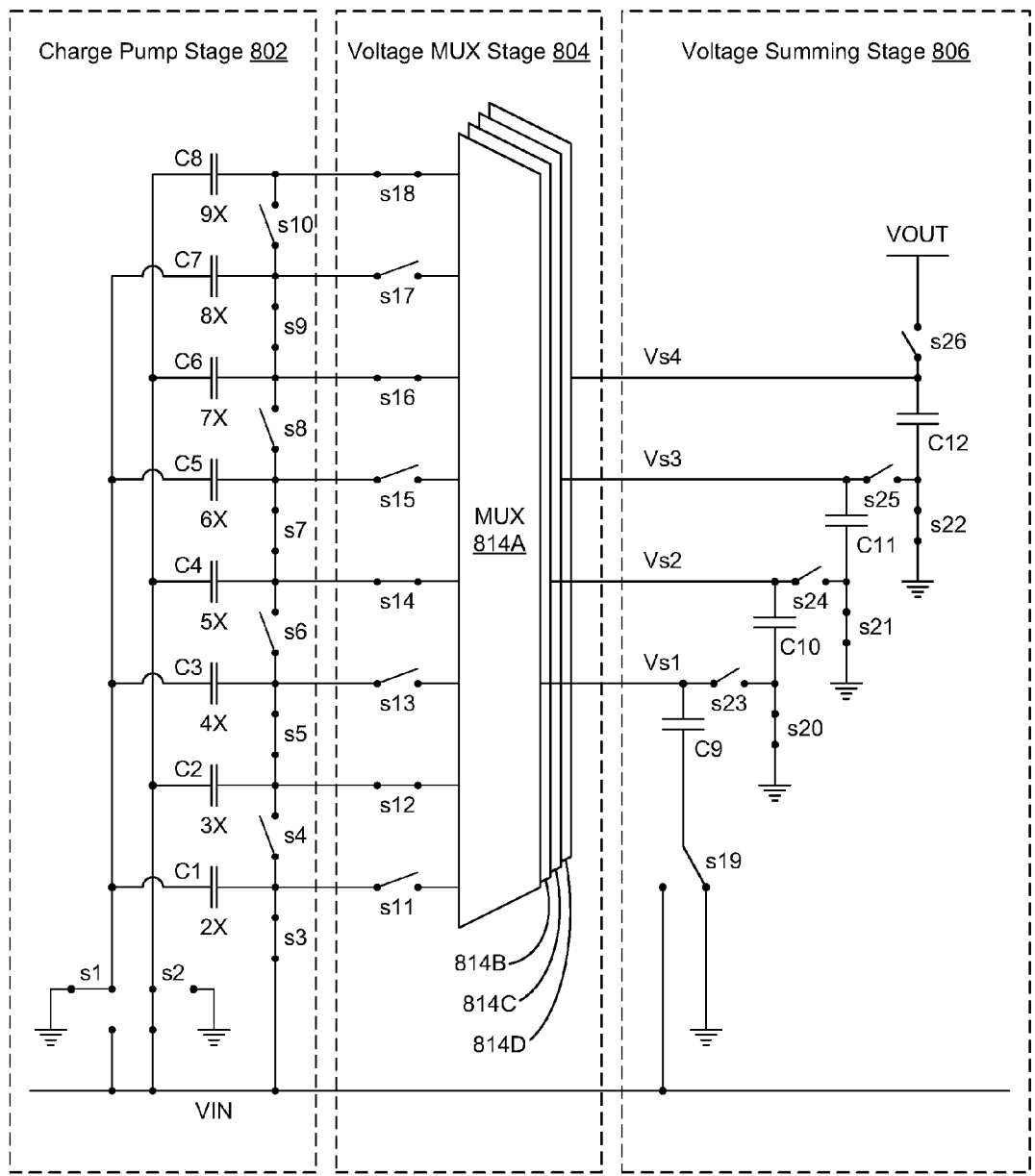
Figure 8C:
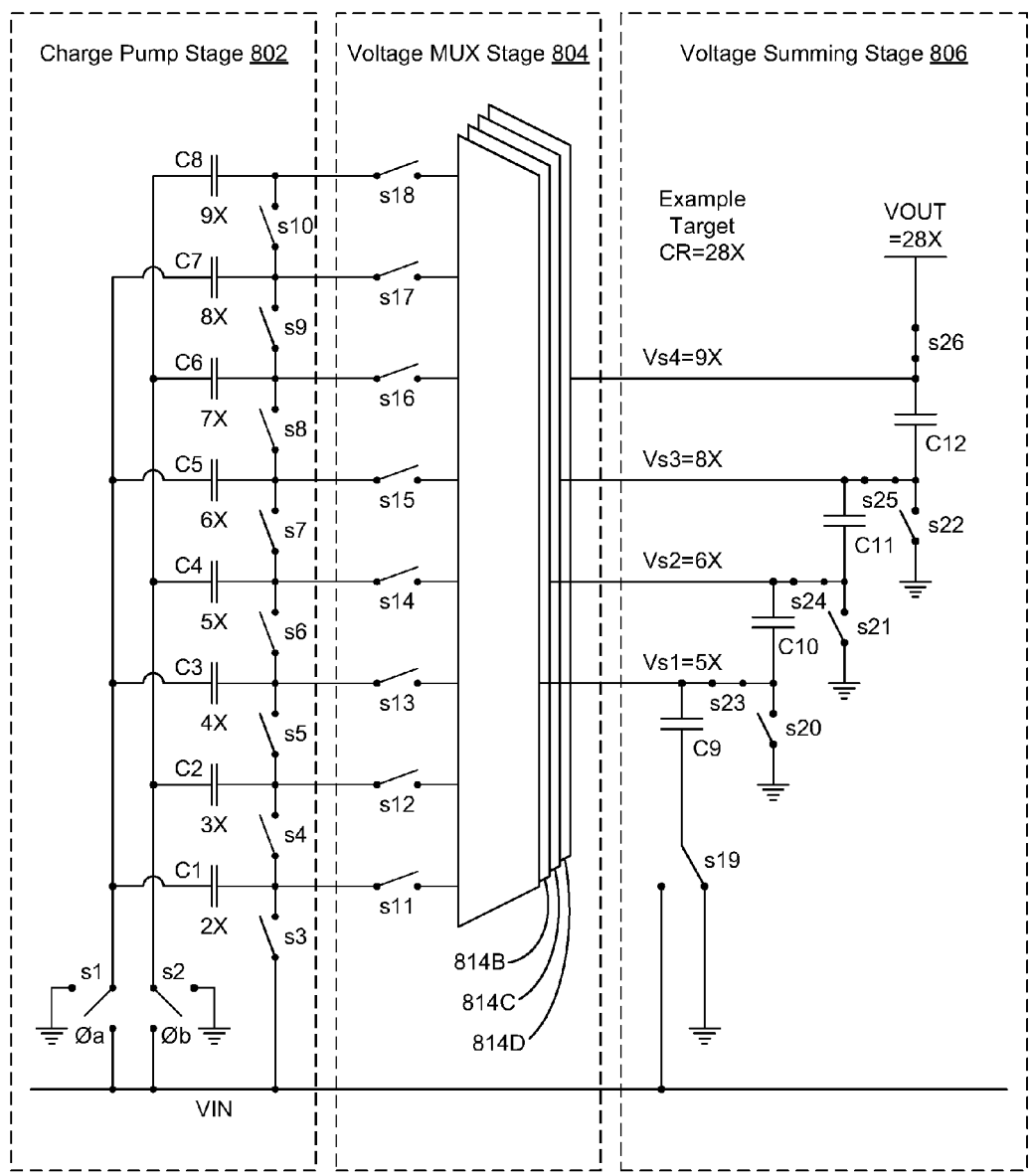

FIGS. 8A-8C illustrate various diagrams of moving-sum charge pump circuitry 800, in accordance with various implementations described herein.

In particular, FIG. 8A illustrates a first phase (Phase A) 800A of the moving-sum charge pump circuitry 800, FIG. 8B illustrates a second phase (Phase B) 800B of the moving-sum charge pump circuitry 800, and FIG. 8C illustrates a third phase (Phase C) 800C of the moving-sum charge pump circuitry 800.

In various implementations, the moving-sum charge pump circuitry 800 may be implemented as an integrated circuit, a discrete circuit, as components on a printed circuit board (PCB), and/or any other similar type of circuitry. In reference to manufacturing and fabrication processes, electronic designers may employ and utilize various techniques to design integrated circuits, discrete circuits, PCBs, and any other similar circuitry, such as physical chips and/or physical layers, to implement the moving-sum charge pump circuitry 800 and/or various techniques associated therewith.

As shown in reference to FIGS. 8A-8C, the moving-sum charge pump circuitry 800 may include multiple stages, including a first stage 802, a second stage 804, and a third stage 806. The first stage 802 may be a charge pump stage, which may be referred to as a charge pump or a reduced charge pump. The second stage 804 may be a voltage multiplexing stage, which may be referred to as a voltage multiplexer (MUX) stage. The third stage 806 may be referred to as a voltage summing stage, which may be referred to as a voltage summer or summing series-parallel stage.

As shown in FIGS. 8A-8C, the charge pump stage 802 may include multiple charge storage elements or capacitors C1-C8 arranged to provide multiple sets of voltages in alternating phases, such as e.g., phase A 800A in FIG. 8A and phase B 800B in FIG. 8B. In some cases, as shown, the multiple capacitors C1-C8 may be arranged in parallel to provide the multiple sets of voltages in the multiple alternating phases A, B. In some cases, the multiple sets of voltages may include different combinations of voltages from the multiple capacitors C1-C8. In an example, as shown, the multiple capacitors may include eight (8) capacitors C1-C8. However, in various implementations, the charge pump stage 802 may include any number of capacitors, and as such, the charge pump stage 802 may provide any number of sets of voltages in any number of alternating phases.

In some cases, the multiple alternating phases A, B may include a first phase A 800A shown in FIG. 8A and a second phase B 800B shown in FIG. 8B. In some cases, the second phase B 800B is different than the first phase A 800A. In some cases, the second phase B 800B is alternated with the first phase A 800A. In some other cases, the second phase B 800B is provided after the first phase A 800A.

The charge pump stage 802 may receive an input voltage VIN in the alternating phases A, B via first and second switches s1, s2. As shown, the first and second switches s1, s2 may be coupled to and switched between a first voltage source, such as, e.g., the input voltage VIN, and a second voltage source, such as e.g., a ground voltage GND. In some cases, each capacitor C1-C8 may receive the input voltage VIN in the alternating phases A, B and provide a different multiple of the input voltage VIN, such as, e.g., 2×-9× of the input voltage VIN. In the alternating phases A, B, the multiple sets of voltages are provided, as shown in FIGS. 8A, 8B. In various implementations, the switches s1, s2 may be implemented with transistors.

In the first phase A 800A of FIG. 8A, the first switch s1 is coupled to the input voltage VIN for charging a first set of capacitors C1, C3, C5, C7. Further, in the first phase A 800A, the second switch s2 is coupled to the ground voltage GND, so as to couple a second set of capacitors C2, C4, C6, C8 to the ground voltage GND. In some instances, to assist with charging the first set of capacitors C1, C3, C5, C7 in the first phase A 800A, switches s3, s5, s7, s9 are open, and switches s4, s6, s8, s10 are closed. Further, in the first phase A 800A, a first set of voltages may be provided from the first set of capacitors C1, C3, C5, C7. For instance, a first capacitor C1 may provide a 2× multiple of the input voltage VIN, a third capacitor C3 may provide a 4× multiple of the input voltage VIN, a fifth capacitor C5 may provide a 6× multiple of the input voltage VIN, and a seventh capacitor C7 may provide an 8× multiple of the input voltage VIN. In various implementations, the switches s3-s10 may be implemented with transistors.

In the second phase B 800B of FIG. 8B, the second switch s2 is coupled to the input voltage VIN for charging the second set of capacitors C2, C4, C6, C8. Further, in the second phase B 800B, the first switch s1 is coupled to the ground voltage GND, so as to couple the first set of capacitors C1, C3, C5, C7 to the ground voltage GND. In some instances, to assist with charging the second set of capacitors C2, C4, C6, C8 in the second phase B 800B, switches s3, s5, s7, s9 are closed, and switches s4, s6, s8, s10 are open. Further, in the second phase B 800B, a second set of voltages may be provided from the second set of capacitors C2, C4, C6, C8. For instance, a second capacitor C2 may provide a 3× multiple of the input voltage VIN, a fourth capacitor C4 may provide a 5× multiple of the input voltage VIN, a sixth capacitor C6 may provide a 7× multiple of the input voltage VIN, and an eighth capacitor C8 may provide a 9× multiple of the input voltage VIN. In various implementations, the switches may be implemented with transistors.

As shown in FIGS. 8A-8C, the voltage MUX stage 804 may include multiple multiplexers 814A, 814B, 814C, 814D arranged to receive the multiple sets of voltages (e.g., the first and second sets of voltages) from the charge pump stage 802 in the multiple alternating phases A, B. In some cases, each multiplexer 814A, 814B, 814C, 814D may provide a selected voltage Vs1, Vs2, Vs3, Vs4 from the multiple sets of voltages based on a conversion ratio (CR). The outputs of the each multiplexer 814A, 814B, 814C, 814D may be referred to as nodes or intermediate nodes that may provide the selected voltage Vs1, Vs2, Vs3, Vs4. Thus, each multiplexer 814A, 814B, 814C, 814D may charge the nodes or intermediate nodes with the selected voltage Vs1, Vs2, Vs3, Vs4.

In some implementations, the conversion ratio (CR) may be pre-selected and may refer to a pre-selected multiple of the input voltage VIN. For instance, the pre-selected multiple may refer to any multiple within a range of multiples, such as, e.g., a range of 2×-36× the input voltage VIN. An example conversion ratio (CR) of 28× VIN is shown in FIG. 8C, which is described in greater detail herein below. In some cases, the multiple multiplexers 814A, 814B, 814C, 814D may be arranged in parallel to separately receive the multiple sets of voltages in the multiple alternating phases A, B. In various instances, in reference to the conversion ratio (CR), the switches may be clocked to provide the pre-selected multiple of the input voltage VIN.

In an example, the multiple multiplexers may include four (4) multiplexers 814A, 814B, 814C, 814D. However, in various implementations, the voltage MUX stage 804 may include any number of multiplexers, and as such, the voltage MUX stage may provide any number of selected voltages and/or any multiple of the input voltage VIN.

As shown in FIG. 8A, to assist the multiple multiplexers 814A, 814B, 814C, 814D with receiving the first set of voltages from the charge pump stage 802 in the first phase A 800A, switches s11, s13, s15, s17 are closed, and switches s12, s14, s16, s18 are open. Further, as shown in FIG. 8B, to assist the multiple multiplexers 814A, 814B, 814C, 814D with receiving the second set of voltages from the charge pump stage 802 in the second phase B 800B, switches s11, s13, s15, s17 are open, and switches s12, s14, s16, s18 are closed. In various implementations, the switches s11-s18 may be implemented with transistors.

As shown in FIGS. 8A-8C, the voltage summing stage 806 may include multiple sampling charge storage elements or capacitors C9, C10, C11, C12 arranged to receive the selected voltages Vs1, Vs2, Vs3, Vs4 from each multiplexer 814A, 814B, 814C, 814D and provide an output voltage VOUT as a sum of the selected voltages Vs1, Vs2, Vs3, Vs4 received from each multiplexer 814A, 814B, 814C, 814D. In some implementations, the sampling capacitors C9, C10, C11, C12 may be referred to as fly capacitors and/or sampling fly capacitors. In some cases, the multiple sampling capacitors C9, C10, C11, C12 may be arranged in parallel to separately receive the selected voltages from each multiplexer 814A, 814B, 814C, 814D. Further, in some other cases, the sum may include or may be referred to as a series sum of the selected voltages Vs1, Vs2, Vs3, Vs4 received from each multiplexer 814A, 814B, 814C, 814D.

In an example, as shown, the multiple sampling capacitors may include four (4) sampling capacitors C9, C10, C11, C12. However, in various implementations, the voltage summing stage 806 may include any number of sampling capacitors depending on the number of multiplexers, and as such, the voltage summing stage 806 may provide the output voltage VOUT as a sum of any number of selected voltages received from any number of multiplexers.

As shown in FIGS. 8A-8B, during the first and second phases A, B, switches s23, s24, s25, s26 are open and switches s19, s20, s21, s22 are closed to thereby couple the sampling capacitors C9, C10, C11, C12 to the ground voltage GND. In this instance, the configuration of FIGS. 8A-8B may assist with charging the sampling capacitors C9, C10, C11, C12 with their corresponding selected voltages Vs1, Vs2, Vs3, Vs4 from each multiplexer 814A, 814B,

814C, 814D, respectively. In various implementations, the switches s23-s26 may be implemented with transistors.

As shown in reference to FIG. 8C, during the third phase C 800C, the first and second switches s1, s2 are in a neutral or floating position with no coupling to the input voltage VIN or the ground voltage GND. Further, as shown, switches s3-s10 are open, and switches s11-s18 are open. Further, as shown, switch s19 remains coupled to the ground voltage GND, switches s20-s22 are open, and switches s23-s26 are closed so as to assist with summing the selected voltages Vs1, Vs2, Vs3, Vs4 in series for output as the output voltage VOUT. Thus, the sum of the the selected voltages Vs1, Vs2, Vs3, Vs4 may be a series sum of the selected voltages Vs1, Vs2, Vs3, Vs4. In one example, a target conversion ratio (CR) of 28× the input voltage VIN may be achieved, e.g., when Vs1=5×, Vs2=6×, Vs3=8×, and Vs4=9×, wherein Vs1+Vs2+Vs3+Vs4 sums to 28× (i.e., 5×+6×+8×+9×=28×). However, in various implementations, any sum may be achieved with this moving-sum technique depending on selected outputs of the multiplexers and various combinational open-closed configurations of the switches. In various instances, in reference to the conversion ratio (CR), the switches may be clocked to provide the pre-selected multiple of the input voltage VIN.

Accordingly, in some implementations, as shown in FIGS. 8A-8C, the charge pump stage 802 may include a first plurality of switching components s1-s10. The multiple sets of voltages may include a first set of voltages from a first set of capacitors C1, C3, C5, C7 and a second set of voltages from a second set of capacitors C2, C4, C6, C8. The alternating phases may include a first phase A 800A and a second phase B 800B, and the first and second sets of voltages may be provided in the alternating phases by switching between the first and second phases A, B with the first plurality of switching components s1-s10.

Further, in some implementations, as shown in FIGS. 8A-8C, the voltage MUX stage 804 may include a second plurality of switching components s11-s18. The multiple multiplexers 814A, 814B, 814C, 814D may be arranged to receive the first and second sets of voltages in the alternating phases A, B by switching between the first and second phases A, B with the second plurality of switching components s11-s18. Therefore, in various instances, in reference to the conversion ratio (CR), the switches may be clocked to provide the pre-selected multiple of the input voltage VIN.

Further, in some implementations, as shown in FIGS. 8A-8C, the voltage summing stage 806 may include a third plurality of switching components s19-s26. The multiple sampling capacitors C9-C12 may be arranged to receive the selected voltages from each multiplexer 814A, 814B, 814C, 814D and may provide the output voltage VOUT as the sum of the selected voltages Vs1, Vs2, Vs3, Vs4 received from each multiplexer 814A, 814B, 814C, 814D by switching the third plurality of switching components s19-s26. In some instances, the sum may be a series sum. In various instances, in reference to the conversion ratio (CR), the switches may be clocked to provide the pre-selected multiple of the input voltage VIN at the voltage output VOUT. In various implementations, the switches s1-s26 may be implemented with transistors.

In accordance with various implementations described herein, the structure and circuitry may be provided as a 3-phase charge pump having a reduced charge pump train with multiple sampling fly capacitors. In the alternating phases A and B, the sampling fly capacitors may be charged by internal nodes in the charge pump train. The nodes may be selected depending on a conversion ratio (CR). In phase C, the multiple sampling capacitors maybe coupled in series to charge the output node VOUT, which may be implemented as the battery node VBAT. This open circuit voltage at the output is therefore the sum of the multiple sampling capacitors. As shown and described in reference to FIGS. 8A-8C, this structure and/or circuitry may use fewer fly capacitors than the conventional circuitry, such as the common Dickson charge pump. Generally, fewer fly capacitors of the present structure and/or circuitry may be initialized with low voltages. Thus, the present structure may utilize less start-up energy and/or start-up time.

Further, this topology may be useful in systems where the charge pump is not running continuously, and this topology may be useful in systems where start-up energy reflects on system efficiency. This is also useful in systems having a charge pump that starts and stabilizes quickly. The structure described herein may be used in duty-cycled energy harvesting systems, light based transmitters, and/or duty-cycled radios. In these systems, fast start-up and lower start-up energy may be utilized.

Figure 9:
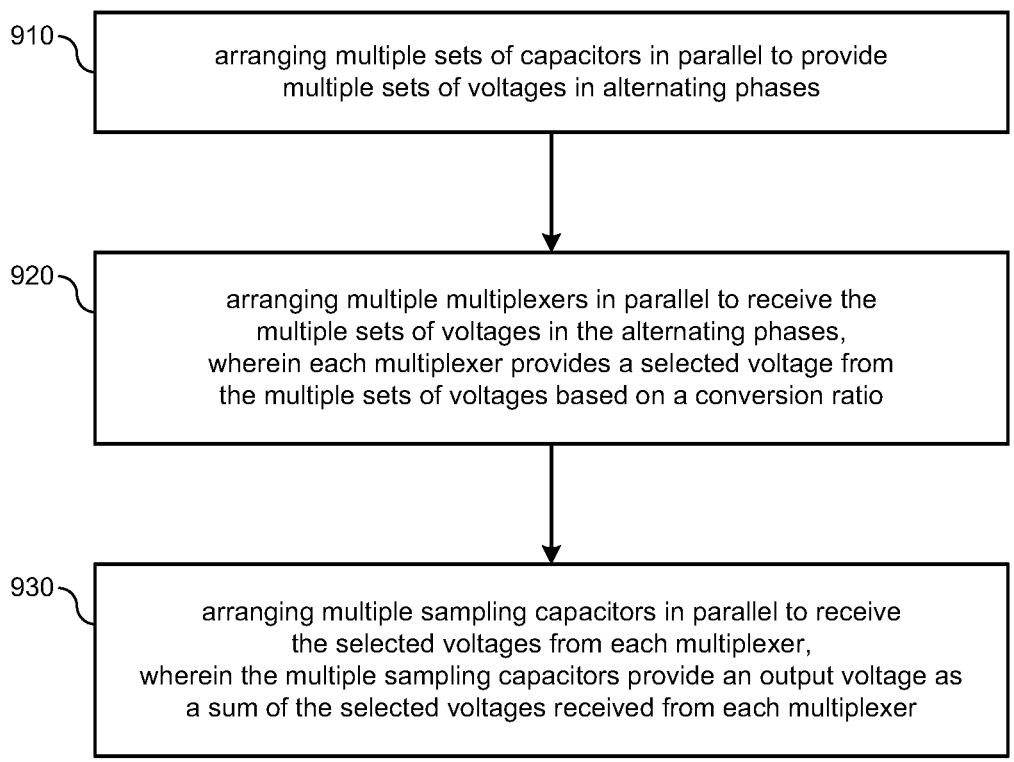
FIG. 9 illustrates a method for implementing a moving-sum charge pump, in accordance with various implementations described herein.

FIG. 9 illustrates a method 900 for implementing a moving-sum charge pump, in accordance with various implementations described herein.

It should be understood that even though method 900 may indicate a particular order of execution of operations, in some instances, various certain portions of the operations may be executed in a different order, and on different systems. In some other instances, additional operations or steps may be added to and/or omitted from method 900. The method 900 may be implemented in hardware and/or software. If implemented in hardware, the method 900 may be implemented with various circuit components, such as described herein above in reference to FIGS. 8A-8C. If implemented in software, the method 900 may be implemented as a program or software instruction process that may be configured for implementing a moving-sum charge pump. Further, if implemented in software, instructions related to implementing the method 900 may be stored in memory and/or a database. For instance, a computer or various other computing devices having a processor and memory may be configured to perform method 900.

In some implementations, method 900 is directed to implementing a moving-sum charge pump. For instance, at block 910, method 900 may arrange multiple sets of charge storage elements or capacitors to provide multiple sets of voltages in alternating phases. In some instances, the multiple sets of capacitors may be arranged in parallel. At block 920, method 900 may arrange multiple multiplexers to receive the multiple sets of voltages in the alternating phases. In some instances, each multiplexer may provide a selected voltage from the multiple sets of voltages based on a conversion ratio (CR). Further, the multiple multiplexers may be arranged in parallel. At block 930, method 900 may arrange multiple sampling charge storage elements or capacitors to receive the selected voltages from each multiplexer. In some instances, the multiple sampling capacitors may provide an output voltage as a sum of the selected voltages received from each multiplexer. Further, the multiple sampling capacitors may be arranged in parallel, and/or the sum may include a series sum.

Described herein are various implementations of an integrated circuit. The integrated circuit may include a charge pump, a voltage multiplexing stage, and a voltage summing stage. The charge pump stage may include multiple charge storage elements or capacitors arranged to provide multiple sets of voltages in alternating phases. The voltage multiplexing stage may include multiple multiplexers arranged to receive the multiple sets of voltages in the alternating phases, and each multiplexer may provide a selected voltage from the multiple sets of voltages based on a conversion ratio. The voltage summing stage may include multiple sampling charge storage elements or capacitors arranged to receive the selected voltages from each multiplexer and provide an output voltage as a sum of the selected voltages received from each multiplexer.

Described herein are various implementations of an integrated circuit. The integrated circuit may include a first stage having multiple charge storage elements or capacitors arranged in parallel to provide first and second combinations of voltages in alternating first and second phases, wherein the first combination of voltages is provided in the first phase and the second combination of voltages is provided in the second phase which is different than the first phase. The integrated circuit may include a second stage having multiple multiplexers arranged in parallel to receive the first and second sets of voltages in the alternating first and second phases, each multiplexer providing a selected voltage from the first and second sets of voltages based on a conversion ratio. The integrated circuit may include a third stage having multiple sampling charge storage elements or capacitors arranged in parallel to receive the selected voltages from each multiplexer and provide an output voltage as a sum of the selected voltages received from each multiplexer.

Described herein are various implementations of a method for implementing a moving-sum charge pump. The method may arrange multiple sets of charge storage elements or capacitors in parallel to provide multiple sets of voltages in alternating phases. The method may arrange multiple multiplexers in parallel to receive the multiple sets of voltages in the alternating phases, and each multiplexer may provide a selected voltage from the multiple sets of voltages based on a conversion ratio. The method may arrange multiple sampling charge storage elements or capacitors in parallel to receive the selected voltages from each multiplexer, and the multiple sampling capacitors may provide an output voltage as a sum of the selected voltages received from each multiplexer.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all may not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An integrated circuit, comprising:
a charge pump stage having multiple charge storage elements arranged to provide multiple sets of voltages in alternating phases;
a voltage multiplexing stage having multiple multiplexers arranged to receive the multiple sets of voltages in the alternating phases, each multiplexer providing a selected voltage from the multiple sets of voltages based on a conversion ratio; and
a voltage summing stage having multiple sampling charge storage elements arranged to receive the selected voltages from each multiplexer and provide an output voltage as a sum of the selected voltages received from each multiplexer.

2. The integrated circuit of claim 1, wherein the charge pump stage receives an input voltage, and wherein each charge storage element receives the input voltage and provides a different multiple of the input voltage.

3. The integrated circuit of claim 1, wherein the multiple charge storage elements are arranged in parallel to provide the multiple sets of voltages in the alternating phases, and wherein the multiple sets of voltages comprise one or more combinations of voltages from the multiple charge storage elements.

4. The integrated circuit of claim 1, wherein the alternating phases include a first phase and a second phase, wherein the second phase is different than the first phase, wherein the second phase is alternated with the first phase, and wherein the second phase is provided after the first phase.

5. The integrated circuit of claim 1, wherein the charge pump stage comprises a first plurality of switching components, wherein the multiple sets of voltages include a first set of voltages and a second set of voltages, wherein the alternating phases include a first phase and a second phase, and wherein the first and second sets of voltages are provided in the alternating phases by switching between the first and second phases with the first plurality of switching components.

6. The integrated circuit of claim 1, wherein the multiple multiplexers are arranged in parallel to separately receive the multiple sets of voltages in the alternating phases.

7. The integrated circuit of claim 1, wherein the voltage multiplexing stage comprises a second plurality of switching components, wherein the multiple sets of voltages include a first set of voltages and a second set of voltages, wherein the alternating phases include a first phase and a second phase, and wherein the multiple multiplexers are arranged to receive the first and second sets of voltages in the alternating phases by switching between the first and second phases with the second plurality of switching components.

8. The integrated circuit of claim 1, wherein the multiple sampling charge storage elements are arranged in parallel to separately receive the selected voltages from each multiplexer.

9. The integrated circuit of claim 1, wherein the sum comprises a series sum of the selected voltages received from each multiplexer.

10. The integrated circuit of claim 1, wherein the voltage summing stage comprises a third plurality of switching components, and wherein the multiple sampling charge storage elements are arranged to receive the selected voltages from each multiplexer and provide the output voltage as the sum of the selected voltages received from each multiplexer by switching the third plurality of switching components.

11. An integrated circuit, comprising:
a first stage having multiple charge storage elements arranged in parallel to provide first and second combinations of voltages in alternating first and second phases, wherein the first combination of voltages is provided in the first phase and the second combination of voltages is provided in the second phase which is different than the first phase;
a second stage having multiple multiplexers arranged in parallel to receive the first and second sets of voltages in the alternating first and second phases, each multiplexer providing a selected voltage from the first and second sets of voltages based on a conversion ratio; and
a third stage having multiple sampling charge storage elements arranged in parallel to receive the selected voltages from each multiplexer and provide an output voltage as a sum of the selected voltages received from each multiplexer.

12. The integrated circuit of claim 11, wherein the first stage receives an input voltage, and wherein each charge storage element receives the input voltage and provides a different multiple of the input voltage.

13. The integrated circuit of claim 11, wherein the multiple charge storage elements include a first set of charge storage elements arranged in a first chain and a second set of charge storage elements arranged in a second chain that is different from the first set of charge storage elements.

14. The integrated circuit of claim 13, wherein the first set of charge storage elements provides the first combination of voltages in the first phase, and wherein the second set of charge storage elements provides the second combination of voltages in the second phase.

15. The integrated circuit of claim 14, wherein each multiplexer receives the first combination of voltages from the first set of charge storage elements in the first phase, and wherein each multiplexer receives the second combination of voltages from the second set of charge storage elements in the second phase.

16. The integrated circuit of claim 11, wherein the sum comprises a series sum of the selected voltages received from each multiplexer.

17. The integrated circuit of claim 11, wherein the first stage comprises a charge pump stage having a first plurality of switching components, and wherein the first and second combinations of voltages are provided in the alternating phases by switching between the first and second phases with the first plurality of switching components.

18. The integrated circuit of claim 11, wherein the second stage comprises a voltage multiplexing stage having a second plurality of switching components, and wherein the multiple multiplexers are arranged in parallel to receive the first and second combinations of voltages in the alternating phases by switching between the first and second phases with the second plurality of switching components.

19. The integrated circuit of claim 11, wherein the third stage comprises a voltage summing stage having a third plurality of switching components, and wherein the multiple sampling charge storage elements are arranged to receive the selected voltages from each multiplexer and provide the output voltage as a series sum of the selected voltages received from each multiplexer by switching the third plurality of switching components.

20. A method, comprising:
arranging multiple sets of charge storage elements in parallel to provide multiple sets of voltages in alternating phases;
arranging multiple multiplexers in parallel to receive the multiple sets of voltages in the alternating phases, wherein each multiplexer provides a selected voltage from the multiple sets of voltages based on a conversion ratio; and
arranging multiple sampling charge storage elements in parallel to receive the selected voltages from each multiplexer, wherein the multiple sampling charge storage elements provide an output voltage as a sum of the selected voltages received from each multiplexer.

* * * * *